(12) United States Patent
Yamamoto et al.

(10) Patent No.: US 8,581,869 B2
(45) Date of Patent: Nov. 12, 2013

(54) INFORMATION PROCESSING APPARATUS, INFORMATION PROCESSING METHOD, AND COMPUTER PROGRAM

(75) Inventors: Kazuyuki Yamamoto, Kanagawa (JP); Tomoya Narita, Kanagawa (JP); Reiko Miyazaki, Tokyo (JP); Yasuyuki Koga, Kanagawa (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 13/166,022

(22) Filed: Jun. 22, 2011

(65) Prior Publication Data

US 2012/0032903 A1     Feb. 9, 2012

(30) Foreign Application Priority Data

Aug. 4, 2010   (JP) ................................. 2010-175637

(51) Int. Cl.
*G06F 3/041*     (2006.01)

(52) U.S. Cl.
USPC .......................................... 345/173; 345/156

(58) Field of Classification Search
USPC .................... 345/173, 174, 175, 156; 715/863
See application file for complete search history.

(56) References Cited

U.S. PATENT DOCUMENTS

| | | | |
|---|---|---|---|
| 2005/0012723 A1* | 1/2005 | Pallakoff ........................ | 345/173 |
| 2008/0180406 A1* | 7/2008 | Han et al. ....................... | 345/173 |
| 2009/0051660 A1* | 2/2009 | Feland et al. .................. | 345/173 |
| 2009/0095540 A1* | 4/2009 | Zachut et al. .............. | 178/18.03 |
| 2009/0150775 A1 | 6/2009 | Miyazaki et al. | |
| 2009/0259969 A1 | 10/2009 | Pallakoff | |
| 2010/0020034 A1 | 1/2010 | Kim | |
| 2010/0103136 A1* | 4/2010 | Ono et al. ...................... | 345/173 |
| 2010/0146458 A1* | 6/2010 | Wadekar ........................ | 715/863 |
| 2010/0146459 A1* | 6/2010 | Repka ............................ | 715/863 |

FOREIGN PATENT DOCUMENTS

| | | |
|---|---|---|
| JP | 2009-157908 | 7/2009 |
| JP | 2010-108061 | 5/2010 |

OTHER PUBLICATIONS

Shen et. al., "Double-side Multi-touch Input for Mobile Devices", Apr. 9, 2009, CHI 2009—Spotlight on Works in Progress, Session 2, pp. 4339-4344.*
Extended European Search Report issued Dec. 9, 2011, in Patent Application No. 11173682.3.
Erh-li (Early) Shen, et al., "Double-side Multi-touch input for Mobile Devices", CHI ~ Spotlight on Works in Progress ~ Session 2, XP 7912043, Apr. 4-9, 2009, pp. 4339-4344.
U.S. Appl. No. 13/107,308, filed May 13, 2011, Yamamoto et al.

* cited by examiner

*Primary Examiner* — Adam R Giesy
*Assistant Examiner* — Andrew Sasinowski
(74) *Attorney, Agent, or Firm* — Oblon, Spivak, McClelland, Maier & Neustadt, L.L.P.

(57) ABSTRACT

There is provided an information processing apparatus including a display section, a contact detection section which is provided on a surface at an opposite side of the display section, and an operation control section which decides, when a predetermined operation input is performed based on a detection result obtained by the contact detection section, not to execute predetermined operation processing corresponding to at least a part of the operation input to the contact detection section.

12 Claims, 9 Drawing Sheets

INFORMATION PROCESSING APPARATUS, INFORMATION PROCESSING METHOD, AND COMPUTER PROGRAM

BACKGROUND

The present disclosure relates to an information processing apparatus, an information processing method, and a computer program, and more particularly to an information processing apparatus including a sensor for detecting contact with an operating object at an opposite side of a display surface, an information processing method, and a computer program.

As a controller of a GUI (Graphical User Interface) which is widespread in smartphones and the like, there is an input device that uses a sensor such as a touch panel. In recent years, a multi-touch detectable touch panel, as it is called, has started to become widespread, which can simultaneously detect a plurality of finger contacts.

Further, the improvement in the operability is realized by providing a device with a plurality of sensors (for example, JP 2010-108061A and JP 2009-157908A). In such a device, when one of the sensors is provided on a surface at the opposite side (back surface) of a display section as a touch panel which detects finger contact, it becomes possible to perform operation input on the back surface side, and even in the case of a compact device, the display screen is not hidden by a finger. Further, by providing the plurality of sensors, there can be realized intuitive interaction and further variations in gestures that have been difficult to be realized in a touch panel of the past.

SUMMARY

However, in the case of providing a back surface side of a device with a sensor which detects finger contact, it is difficult for a user to visually recognize the sensor during operation. Accordingly, there was an issue that the user unintentionally touched the sensor provided on the back surface. As a result, the device executes processing in response to contact information detected by the device, and a malfunction occurs.

In light of the foregoing, it is desirable to provide an information processing apparatus, an information processing method, and a computer program, which are novel and improved, and which are capable of preventing the malfunction.

According to an embodiment of the present disclosure, there is provided an information processing apparatus which includes a display section, a contact detection section which is provided on a surface at an opposite side of the display section, and an operation control section which decides, when a predetermined operation input is performed based on a detection result obtained by the contact detection section, not to execute predetermined operation processing corresponding to at least a part of the operation input to the contact detection section.

Here, when a plurality of contact points are detected by the contact detection section, the operation control section may decide not to execute operation processing corresponding to an operation input based on a contact point other than an initially detected contact point.

Further, when the information processing apparatus is in a predetermined functional state, the operation control section may decide, even in a case of determining that the operation input is performed based on the detection result obtained by the contact detection section, not to execute operation processing corresponding to the operation input.

The information processing apparatus according to an embodiment of the present disclosure may further include a second contact detection section at a side of the display section. In this case, when a contact point is detected by the second contact detection section, even if the information processing apparatus is in the predetermined functional state, the operation control section may decide to execute operation processing corresponding to the detection result obtained by the contact detection section.

Further, when an amount of displacement of a contact point within a predetermined time period is equal to or less than a predetermined amount based on the detection result obtained by the contact detection section, the operation control section may decide not to execute the predetermined operation processing corresponding to at least a part of the operation input to the contact detection section.

The information processing apparatus according to an embodiment of the present disclosure may further include a second contact detection section at a side of the display section. In this case, when an operation input is detected only from the contact detection section based on the detection result obtained by the contact detection section and a detection result obtained by the second contact detection section, the operation control section may decide not to execute operation processing corresponding to the operation input.

The information processing apparatus according to an embodiment of the present disclosure may further include a second contact detection section at a side of the display section. In this case, when a distance between coordinates of a contact point detected by the contact detection section and coordinates of a contact point detected by the second contact detection section is equal to or less than a predetermined value, the operation control section may decide not to execute operation processing corresponding to the operation input.

Further, when the distance between the coordinates of the contact point detected by the contact detection section and the coordinates of the contact point detected by the second contact detection section is equal to or less than the predetermined value, and when a distance between coordinates of a predetermined object displayed on the display section and the coordinates of the contact point detected by the contact detection section is equal to or less than a second predetermined value, the operation control section may decide not to execute operation processing corresponding to the operation input.

In addition, when a contact area on the contact detection section is equal to or more than a predetermined value based on the detection result obtained by the contact detection section, the operation control section may decide not to execute the predetermined operation processing corresponding to at least a part of the operation input to the contact detection section.

When it is detected that a predetermined operation input is further performed within a predetermined time period after a contact point is detected by the contact detection section, the operation control section may decide to execute operation processing based on the contact point.

Further, when a time period taken for performing the operation input to the contact detection section is equal to or less than a predetermined time period based on the detection result obtained by the contact detection section, the operation control section may decide not to execute the predetermined operation processing corresponding to at least a part of the operation input to the contact detection section.

Further, according to another embodiment of the present disclosure, there is provided an information processing method which includes detecting, by a contact detection section which is provided on a surface at an opposite side of a display section, contact with an operating object, and deciding, when a predetermined operation input is performed based on a detection result obtained by the contact detection section, not to execute predetermined operation processing corresponding to at least a part of the operation input to the contact detection section.

In addition, according to another embodiment of the present disclosure, there is provided a computer program for causing a computer to function as an information processing apparatus which includes a contact detection section-control section which causes a contact detection section provided on a surface at an opposite side of a display section to detect contact with an operating object, and an operation control section which decides, when a predetermined operation input is performed based on a detection result obtained by the contact detection section, not to execute predetermined operation processing corresponding to at least a part of the operation input to the contact detection section.

The program is stored in a storage device included in a computer, and can cause the computer to function as the information processing apparatus by being read and executed by a CPU included in the computer. Further, there is also provided a computer-readable recording medium in which the program is recorded. The recording medium is, for example, a magnetic disk, an optical disk, or an MO (Magneto Optical) disk. Examples of the magnetic disk include a hard disk and a disc-like magnetic disk. Further, examples of the optical disk include a CD (Compact Disc, a DVD-R (Digital Versatile Disc Recordable), and a BD (Blu-Ray Disc (registered trademark)).

According to the embodiments of the present disclosure described above, there can be provided the information processing apparatus, the information processing method, and the computer program, which are capable of preventing a malfunction.

DETAILED DESCRIPTION OF THE EMBODIMENT(S)

Figure 1:
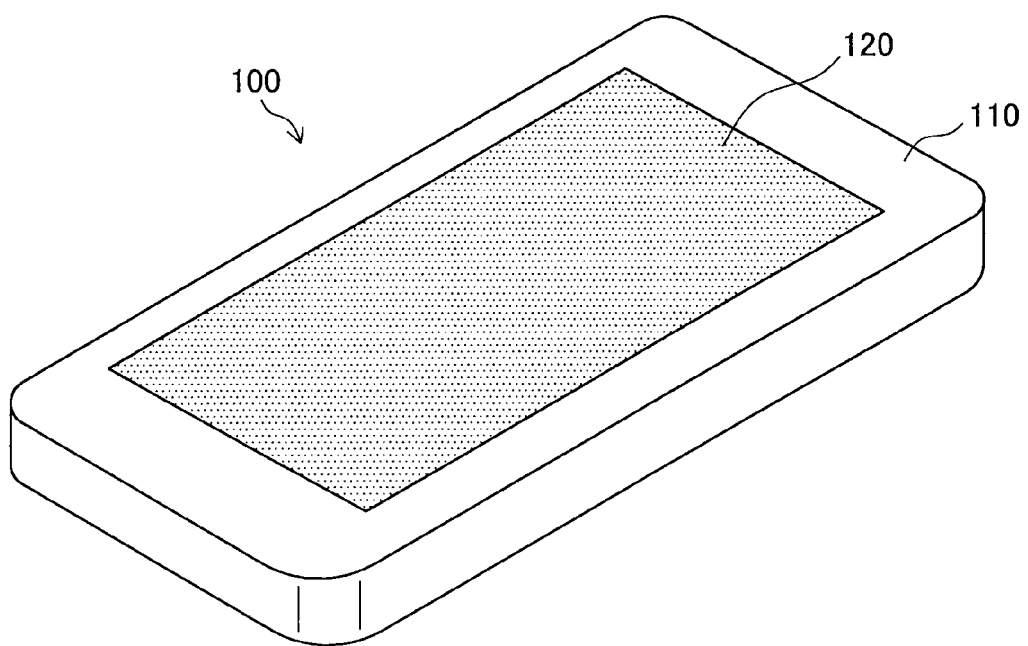
FIG. 1 is a schematic perspective view showing a display surface side of an information processing terminal according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Configuration of information processing terminal
2. Processing of determining execution of operation processing in information processing terminal
3. Example of hardware configuration <1. Configuration of Information Processing Terminal>

[Appearance Example of Information Processing Terminal]

Figure 2:
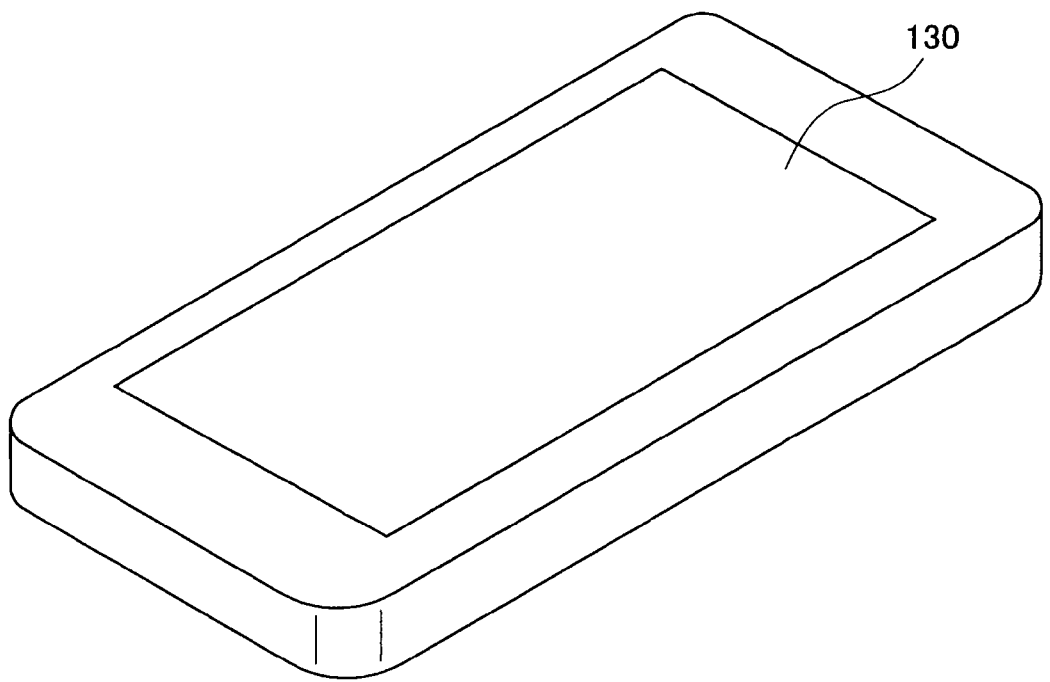
FIG. 2 is a schematic perspective view showing a back surface side of the information processing terminal according to the embodiment.

First, with reference to FIG. 1 and FIG. 2, a schematic configuration of an information processing terminal 100 according to an embodiment of the present disclosure will be described. Note that FIG. 1 is a schematic perspective view showing a display surface side of the information processing terminal 100 according to the present embodiment. FIG. 2 is a schematic perspective view showing a back surface side of the information processing terminal 100 according to the present embodiment.

In the information processing terminal 100 according to the present embodiment, there are provided a display section 120 on one surface (display surface) of a casing 110, and a touch sensor 130 capable of detecting contact of an operating object such as a finger with a surface at the opposite side (back surface) of the display surface. As for the display section 120, there can be used a liquid crystal display and an organic EL display, for example. Further, as for the touch sensor 130, there can be used a capacitive touch sensor. Note that, in the information processing terminal 100 according to the present embodiment, a touch sensor (not shown) may also be provided at the display surface side.

[Functional Configuration]

Figure 3:
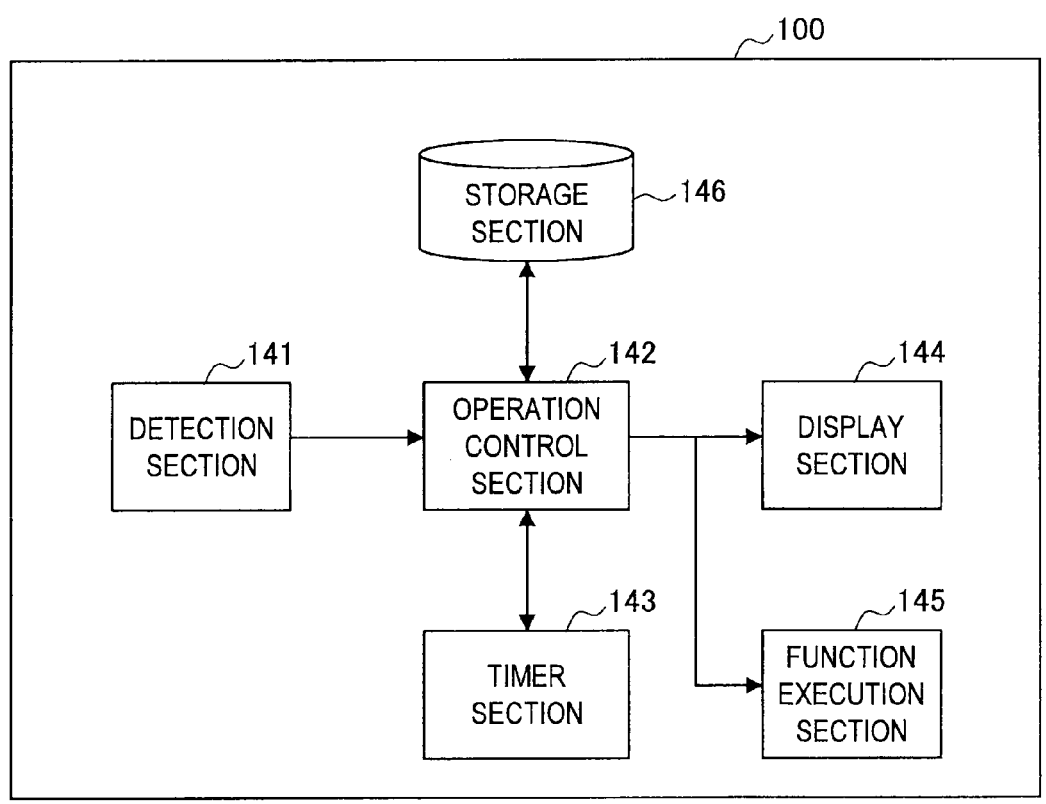
FIG. 3 is a functional block diagram showing a functional configuration of the information processing terminal according to the embodiment.

Next, with reference to FIG. 3, a functional configuration of the information processing terminal 100 according to the present embodiment will be described. FIG. 3 is a functional block diagram showing the functional configuration of the information processing terminal 100 according to the present embodiment. As shown in FIG. 3, the information processing terminal 100 according to the present embodiment includes a detection section 141, an operation control section 142, a timer section 143, a display section 144, a function execution section 145, and a storage section 146.

The detection section 141 is a sensor which detects contact of an operating object with the information processing terminal 100, and corresponds to the touch sensor 130 shown in FIG. 2. In the information processing terminal 100 according to the present embodiment, the detection section 141 is provided at least at the back surface side, as shown in FIG. 1 and FIG. 2. Further, a detection section may also be provided at the display surface side and other positions.

The operation control section 142 decides, based on a detection result obtained by the detection section 141, availability of execution of operation processing by the operation input. The operation control section 142 determines whether or not the operation input detected by the detection section 141 is the operation intentionally performed by a user, based on a predetermined rule. In the case where it is determined that the operation input is not the operation intentionally performed by the user, the operation control section 142 decides not to execute the operation processing based on the operation input. Examples of the predetermined rule include, in the case where there are a plurality of operation inputs, a rule that enables only a predetermined operation input, a rule based on a state of an operation input, and a rule based on a functional state of the information processing terminal 100. Detailed processing will be described later. When the operation control section 142 decides the availability of execution of operation processing corresponding to the operation input, the operation control section 142 outputs the result to the display section 144 or to the function execution section 145.

The timer section 143 counts the elapse of time in response to an instruction of the operation control section 142, and outputs a count value to the operation control section 142. The count value of the timer section 143 can be used in deciding the availability of execution of operation processing by the operation input. Note that, the timer section 143 may not necessarily be included in the information processing terminal 100.

The display section 144 is an output device for displaying information, and corresponds to the display section 120 shown in FIG. 1. On the display section 144, the information is displayed based on display information decided by the operation control section 142.

The function execution section 145 executes the operation processing or inhibits the execution of the operation processing, based on the availability of execution of operation processing by the operation input, which has been decided by the operation control section 142.

The storage section 146 stores setting information used when the operation control section 142 decides the availability of execution of operation processing by the operation input. As the setting information, there are a predetermined rule for deciding the availability of execution of operation processing by the operation input and a value used for the determination based on the predetermined rule, for example. The setting information stored in the storage section 146 may be set in advance, or may be set by the user.

<2. Processing of Determining Execution of Operation Processing in Information Processing Terminal>

Using the information processing terminal 100, the user can operate the information displayed on the display surface by causing a finger to touch and to move on the detection section 141 provided at back surface side of the terminal or by tapping the detection section 141. However, since the user performs the operation input while visually recognizing display contents on the display surface during operation, it is difficult to perform the operation input while visually recognizing the detection section 141 provided at the back surface side. Accordingly, there may occur a malfunction caused by an unintended contact with the detection section 141, and hence, the information processing terminal 100 according to the present embodiment prevents the operation processing corresponding to the operation input which is estimated to be an erroneous operation by the operation control section 142 from being executed.

Hereinafter, with reference to FIGS. 4 to 8, the processing of determining execution of operation processing in the information processing terminal 100 according to the present embodiment will be described in detail.

[Processing of Determining Execution of Operation Processing when Detection Section is Provided only on Back Surface]

Figure 4:
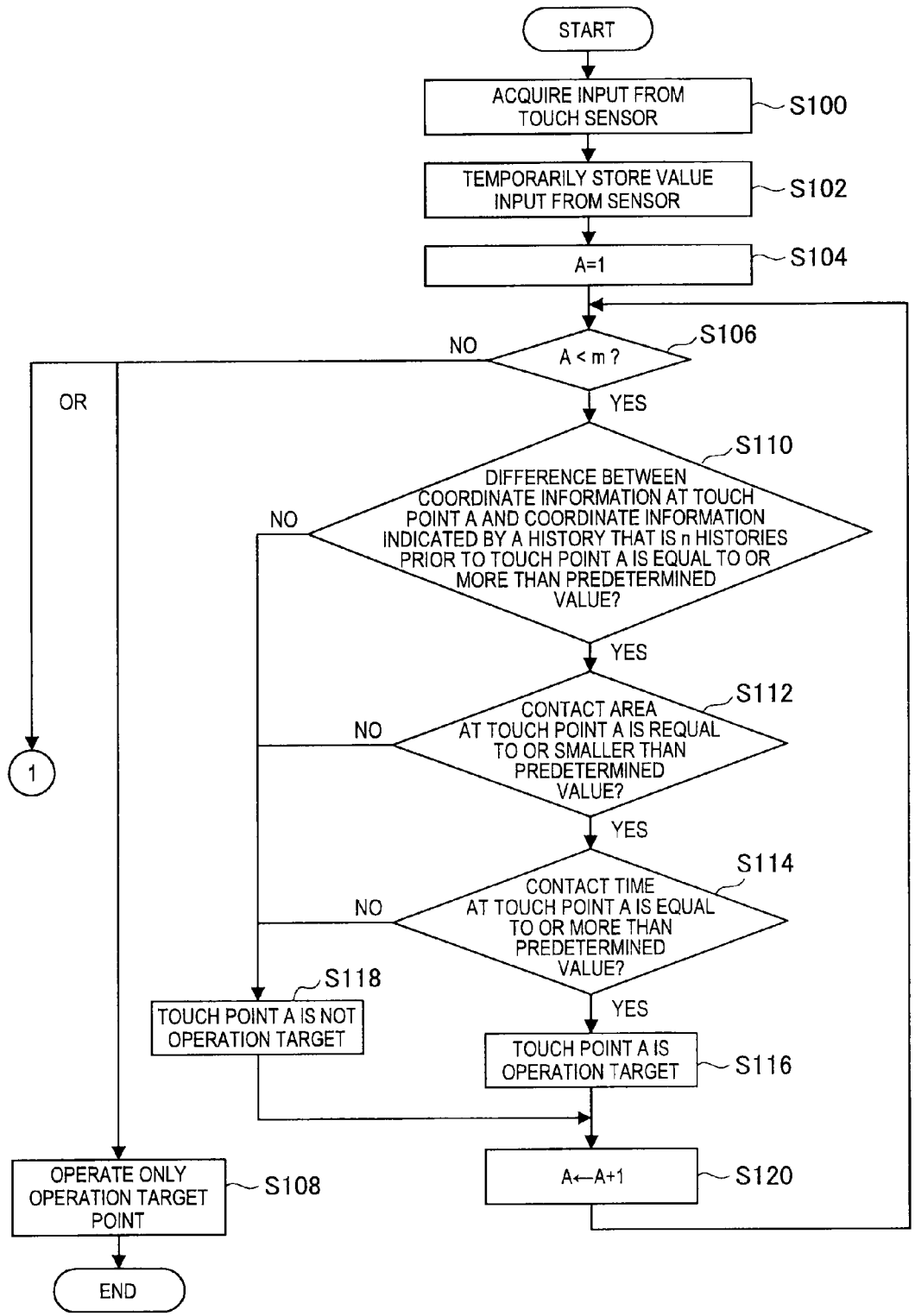
FIG. 4 is a flowchart showing processing of determining execution of operation processing when a detection section is provided only on a back surface.
Figure 5:
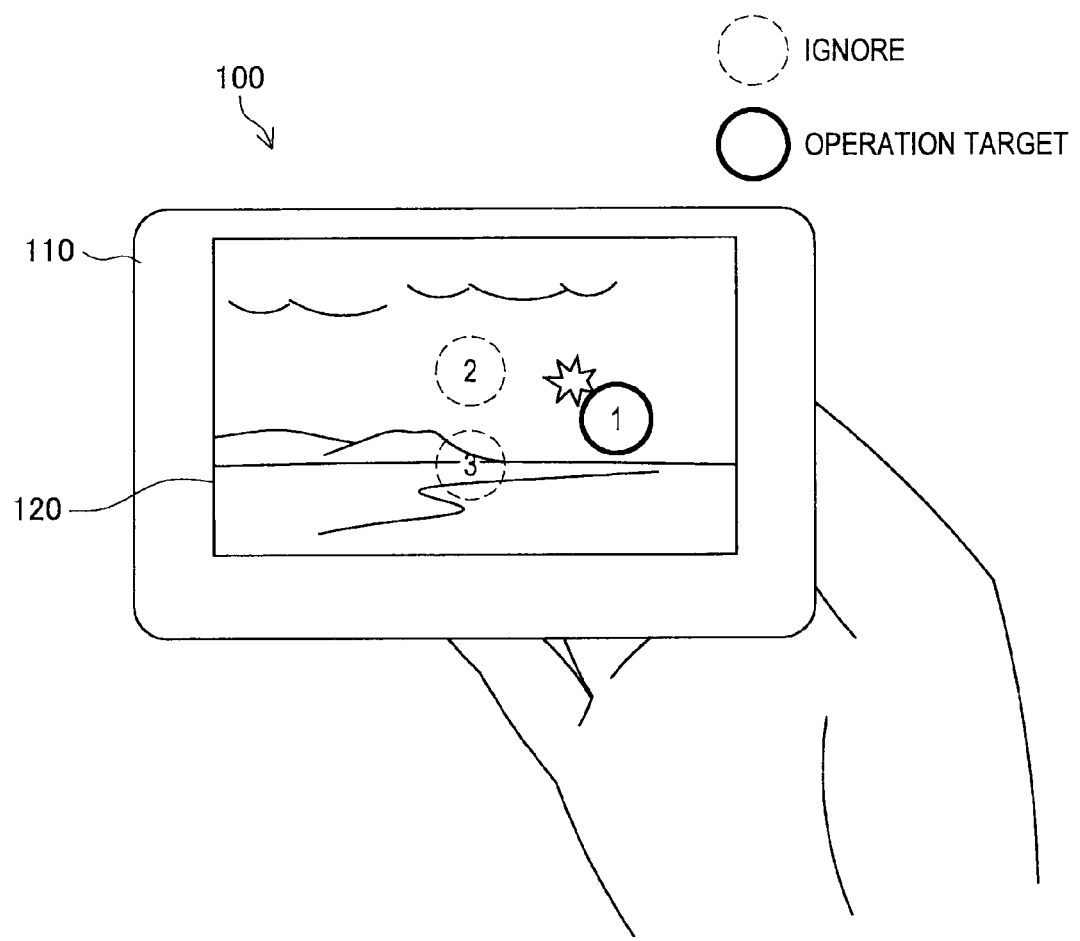
FIG. 5 is an explanatory diagram illustrating availability of execution of operation processing corresponding to an operation input when a plurality of contact points are detected by the detection section.

First, with reference to FIG. 4 and FIG. 5, there will be described processing of determining execution of operation processing when the detection section 141 is provided only on a back surface. Note that FIG. 4 is a flowchart showing the processing of determining execution of operation processing when the detection section 141 is provided only on the back surface. FIG. 5 is an explanatory diagram illustrating availability of execution of operation processing corresponding to an operation input when a plurality of contact points are detected by the detection section 141.

In the information processing terminal 100 according to the present embodiment, first, as shown in FIG. 4, the touch sensor 130 (that is, the detection section 141) detects a touch point, which is a contact point on the back surface of the information processing terminal 100 (S100). The touch sensor 130 according to the present embodiment is capable of detecting a plurality of contact points. The touch sensor 130 outputs the following to the operation control section 142: the number of detected touch points represented by "m"; representative coordinates $(X1, Y1), (X2, Y2), \ldots,$ and $(Xm, Ym)$ for respective touch points; and a capacitance for each grid in the touch sensor 130. The operation control section 142 temporarily stores the input pieces of information in a memory (not shown) (S102).

Next, the operation control section 142 specifies a touch point to be operated by processing from Steps S104 to S120. In the processing, one or more touch points detected by the touch sensor 130 are sequentially determined, one by one, whether or not to use the touch point as the operation target. First, "1" is set as an initial value for the number of touch points to be processed represented by "A" (S104). Note that "A" is a positive number $(A=1, 2, 3, \ldots)$. After that, it is determined whether or not the number of touch points to be processed represented by "A" is less than the number of detected touch points represented by "m" (S106), and in the case where A<m is not satisfied, the number of touch points is 1, and hence, this touch point is decided to be the operation target, and the operation processing corresponding to the touch point is executed (S108). Note that, in this case, the processing of FIG. 7 or FIG. 8 to be described later may be continuously executed.

On the other hand, when the number of touch points to be processed in Step S106 represented by "A" is less than the number of detected touch points represented by "m", the operation control section 142 determines whether or not the difference between coordinate information at a touch point A and coordinate information indicated by a history that is n histories prior to the touch point A is equal to or more than a predetermined value (S110), "n" representing the number of histories. In Steps S110 to S114, it is determined whether or not the contact is erroneous, in other words, whether or not the contact is a motion that the user intentionally performs, and there is performed processing of extracting the motion that the user intentionally performs. In Step S110, when the user causes the operating object to move an amount equal to or more than a predetermined value while n histories are acquired, it is determined that the user intentionally causes the operating object to touch the touch sensor 130 and intentionally causes the operating object to move on the touch sensor 130.

In Step S110, in the case where the difference between the coordinate information at the touch point A and the coordinate information indicated by the history that is n histories prior to the touch point A is less than the predetermined value, the operation control section 142 does not set the touch point A as an operation target (S118), then prepares to start processing of a touch point A+1, which is the next touch point (S120), and repeats the processing from Step S106. On the other hand, in the case where, in Step S110, the difference between the coordinate information at the touch point A and the coordinate information indicated by the history that is n histories prior to the touch point A is equal to or more than the predetermined value, the operation control section 142 sets the touch point A as a candidate for the operation target and performs the next processing (S112).

In Step S112, the operation control section 142 determines whether or not a contact area of the operating object at the touch point A is equal to or smaller than a predetermined value. The contact area on the touch sensor 130 can be calculated from representative coordinates for respective touch points and a capacitance for each grid. In the case where the contact area on the touch sensor 130 is more than the predetermined value, it is highly possible that the operating object is caused to touch the touch sensor 130 for a reason other than performing operation input, like the user holding the terminal.

Accordingly, in the case where the contact area of the operating object at the touch point A is larger than the predetermined value, the operation control section 142 does not set the touch point A as an operation target (S118), then prepares to start processing of the next touch point A+1 (S120), and repeats the processing from Step S106. On the other hand, in the case where it is determined in Step S112 that the contact area of the operating object at the touch point A is equal to or less than the predetermined value, the operation control section 142 sets the touch point A as a candidate for the operation target and performs the next processing (S114).

In Step S114, the operation control section 142 determines whether or not contact time of the operating object at the touch point A on the touch sensor 130 is equal to or more than a predetermined value. In the case where the contact time is less than the predetermined value, it is highly possible that the user cases the operating object to touch the touch sensor 130 by mistake. Accordingly, in the case where the contact time at the touch point A on the touch sensor 130 is less than the predetermined value, the operation control section 142 does not set the touch point A as an operation target (S118), then prepares to start processing of the next touch point A+1 (S120), and repeats the processing from Step S106. On the other hand, in the case where it is determined in Step S146 that the contact time at the touch point A on the touch sensor 130 is equal to or more than a predetermined value, the operation control section 142 sets the touch point A as the operation target (S116). After that, the operation control section 142 prepares to start processing of the next touch point A+1 (S120), and repeats the processing from Step S106.

Heretofore, there has been described the processing of determining execution of operation processing when the detection section 141 is provided only on the back surface. Based on the processing flow shown in FIG. 4, the information processing terminal 100 determines a touch point to be an operation target, and the operation processing associated to the touch point is executed. Note that in FIG. 4, in order to extract an operation target from the detected touch points, there are performed processes of Steps S110 to S114, that is, determination processes on the movement amount, the contact area, and the contact time of the operating object, but the present disclosure is not limited to such an example. For example, the operation target may be extracted by executing at least one of those determination processes.

Further, although the contact time at the touch point is within the predetermined value, in the case where a specific operation (for example, a gesture of drawing a circle or double tapping) which is set in advance is detected, there may be executed operation processing based on the detected operation. Accordingly, it becomes possible for the user to execute the operation processing without waiting for a timing of starting operation, and a stress caused by waiting for the start of operation can be reduced.

In addition, as shown in FIG. 5, in the case where a plurality of touch points are detected, a touch point at which the operating object initially touches the touch sensor 130 may be set as the operation target, and a touch point touched by the operating object after the first touch point may not be set as an operation target. In this case, it is necessary that the information processing terminal 100 include a multi-touch sensor which is capable of tracking a plurality of contact points.

Further, when the information processing terminal 100 is in a predetermined functional state, even though there is a detection by the touch sensor 130, the operation control section 142 may not cause the operation processing corresponding to the touch point to be executed. As the predetermined functional state of the information processing terminal 100 which prevents the operation processing corresponding to the touch point from being executed, there are exemplified a state where the screen on the display section 120 is off, a state where a screen saver is displayed, and a sleep state where the processor is off.

Further, for example, when a touch sensor is provided at each of the display surface side and the back surface side of the information processing terminal 100, it may also be set in a manner that a task can be cancelled from the display surface side but cannot be cancelled from the back surface side, that is, also when a predetermined task is in execution, the operation processing corresponding to the touch point detected by the touch sensor at the back surface side may not be executed. In addition, it may also be set in a manner that a task can be cancelled from the display surface side but cannot be cancelled from the back surface side, that is, also in the case where the screen is locked, the operation processing corresponding to the touch point detected by the touch sensor at the back surface side may not be executed.

Figure 6:
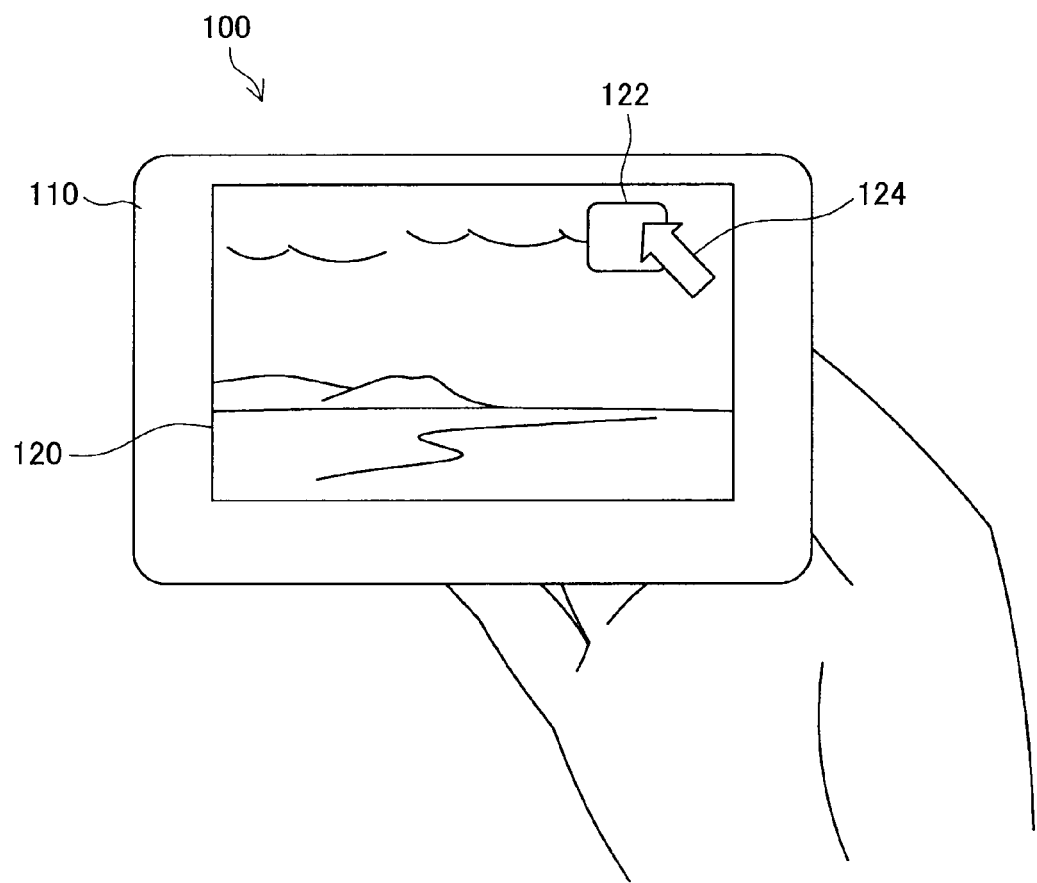
FIG. 6 is an explanatory diagram showing an example of unlocking a screen.

For example, as shown in FIG. 6, an unlock icon 122 for unlocking the screen may be displayed on the display section 120 of the information processing terminal 100. The unlock icon 122 can be operated by the touch sensor at the display surface side, but cannot be operated by the touch sensor at the back surface side. Accordingly, a cursor 124 operated by the touch sensor at the back surface side displayed on the display section 120 cannot press the unlock icon 122. In this way, in the case where the screen is locked, it may be set in a manner that the operation processing corresponding to the touch point detected by the touch sensor at the back surface side is not executed.

[Processing of Determining Execution of Operation Processing when Detection Section is Provided on each of Display Surface and Back Surface]

Figure 7:
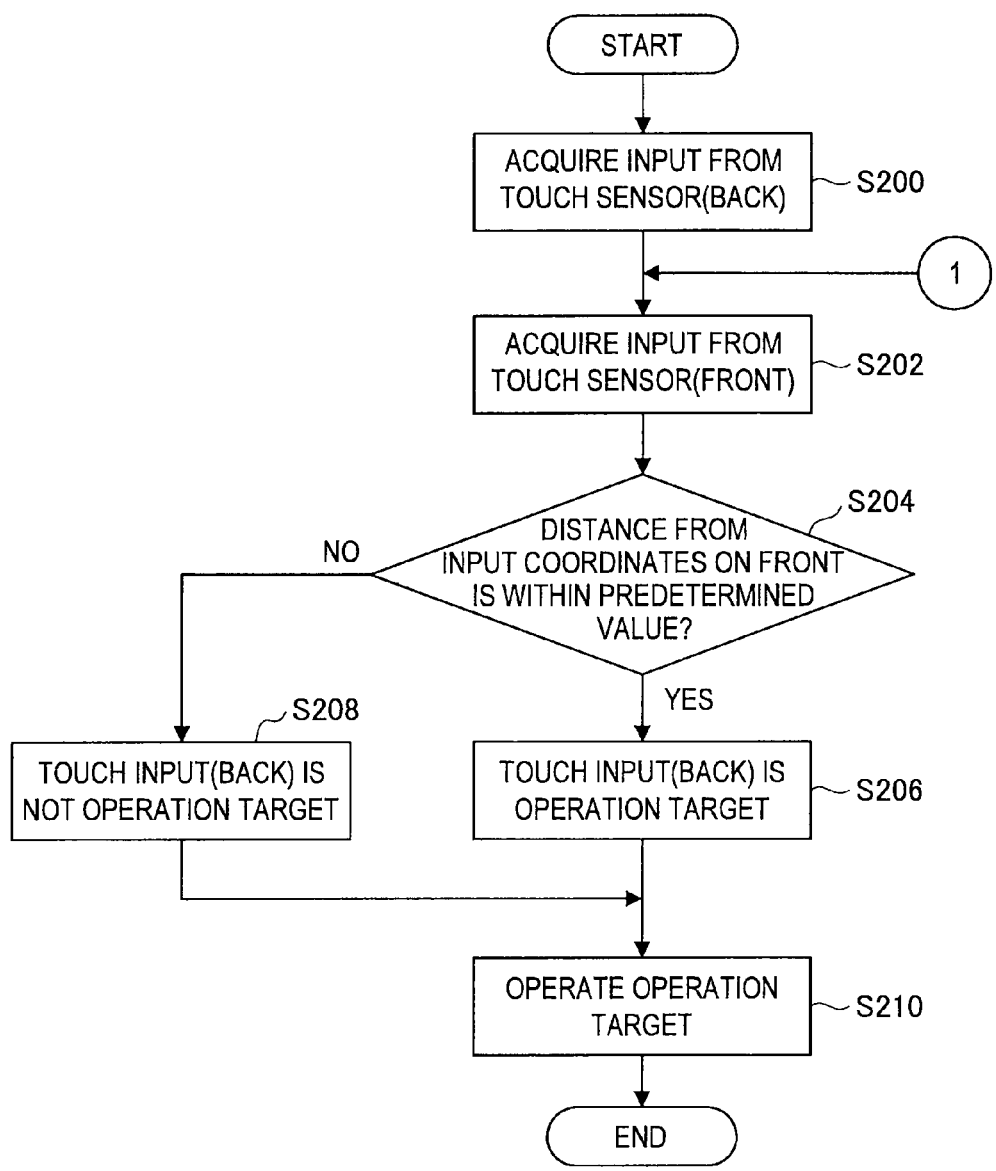
FIG. 7 is a flowchart showing processing of determining execution of operation processing when a detection section is provided on each of the display surface and the back surface.

Next, with reference to FIG. 7, there will be described processing of determining execution of operation processing when the detection section 141 is provided on each of the display surface and the back surface. Note that FIG. 7 is a flowchart showing the processing of determining execution of operation processing when the detection section 141 is provided on each of the display surface and the back surface. Note that, in the description below, the touch sensor at the back surface side is represented by a reference numeral 130a and the touch sensor at the display surface side is represented by a reference numeral 130b.

In the example shown in FIG. 7, there is shown processing in the case of enabling an operation input to the touch sensor at the back surface side in a specific state. As shown in FIG. 7, first, the operation control section 142 acquires an input to the touch sensor 130a at the back surface side and an input to the touch sensor 130b at the display surface side (S200, S202).

Next, the operation control section 142 calculates a distance between input coordinates on the touch sensor 130*a* at the back surface side and input coordinates on the touch sensor 130*b* at the display surface side, and determines whether or not the calculated distance is within a predetermined value (S204). In this example, in the case where there are operation inputs simultaneously to the display surface side and the back surface side, and in the case where the operations are simultaneously performed, the operation input to the touch sensor 130*a* at the back surface side is also enabled. Accordingly, in Step S204, first, it is determined whether or not there are inputs to both the two touch sensors 130*a* and 130*b*. In the case where there are inputs to both the two touch sensors 130*a* and 130*b*, it is determined whether or not the operations are simultaneously performed, thereby determining whether or not to enable the operation input to the touch sensor 130*a* at the back surface side.

For example, based on the detection results obtained by the touch sensor 130*a* at the back surface side and the touch sensor 130*b* at the display surface side, when it is detected that there is performed an operation of pinching or twisting an object displayed on the display section 120 by causing fingers to touch the touch sensor 130*a* at the back surface side and the touch sensor 130*b* at the display surface side, thereby holding the touch sensor 130*a* at the back surface side and the touch sensor 130*b* at the display surface side between the fingers, the operation control section 142 enables the operation input from the touch sensor 130*a* at the back surface side.

Further, when a gesture of pinching an object displayed on the display section 120 is detected, it can be considered that the input coordinates on the touch sensor 130*a* at the back surface side and the input coordinates on the touch sensor 130*b* at the display surface side are not far apart. Accordingly, when the distance between the input coordinates on the touch sensor 130*a* at the back surface side and the input coordinates on the touch sensor 130*b* at the display surface side is calculated and in the case where the calculated distance is within the predetermined value, the operation input to the touch sensor 130*a* at the back surface side is also enabled. Also in the case where an operation performed by pinching an object is detected, the operation input to the touch sensor 130*a* at the back surface side is enabled in the same manner, the operation including moving the object, rotating a dial, moving a slide bar, scrolling operation, a pinching operation for stretching and extending the object, and a gesture operation for drawing a specific trace, for example.

Note that, in Step S204, although the distance between the input coordinates on the touch sensor 130*a* at the back surface side and the input coordinates on the touch sensor 130*b* at the display surface side is calculated and the calculated distance is used for the determination, whether or not a distance (second distance) between the object displayed on the display section 120 and the touch sensor 130*a* at the back surface side is within a predetermined value may additionally be determined.

To summarize the above, in Step S204, when there are operation inputs to two touch sensors 130*a* and 130*b*, or when the input coordinates on two touch sensors 130*a* and 130*b* are within a predetermined range, the touch point on the touch sensor 130*a* at the back surface side is set as an operation target (S206). Note that, as described above, for the latter determination condition, there may be further added the determination condition of whether or not the distance (second distance) between the object displayed on the display section 120 and the touch sensor 130*a* at the back surface side is within a predetermined value. On the other hand, in the case where neither of the determination conditions are satisfied in Step S204, the touch point on the touch sensor 130*a* at the back surface side is not set as an operation target (S208).

After that, the operation control section 142 executes operation processing corresponding to the touch point set as an operation target based on the determination results of Steps S204 to S208 (S210). In this way, when the detection results of the touch sensor 130*a* at the back surface side and the touch sensor 130*b* at the display surface side are synchronized, the operation control section 142 determines that the operation input to the touch sensor 130*a* at the back surface side is not an erroneous operation, and enables the operation input to the touch sensor 130*a*. Thus, in the case where the user unintentionally touches the touch sensor 130*a* at the back surface side, the operation input is disabled, and hence, an erroneous operation can be prevented.

[Processing of Determining Execution of Operation Processing when Explicit Motion is Added]

Figure 8:
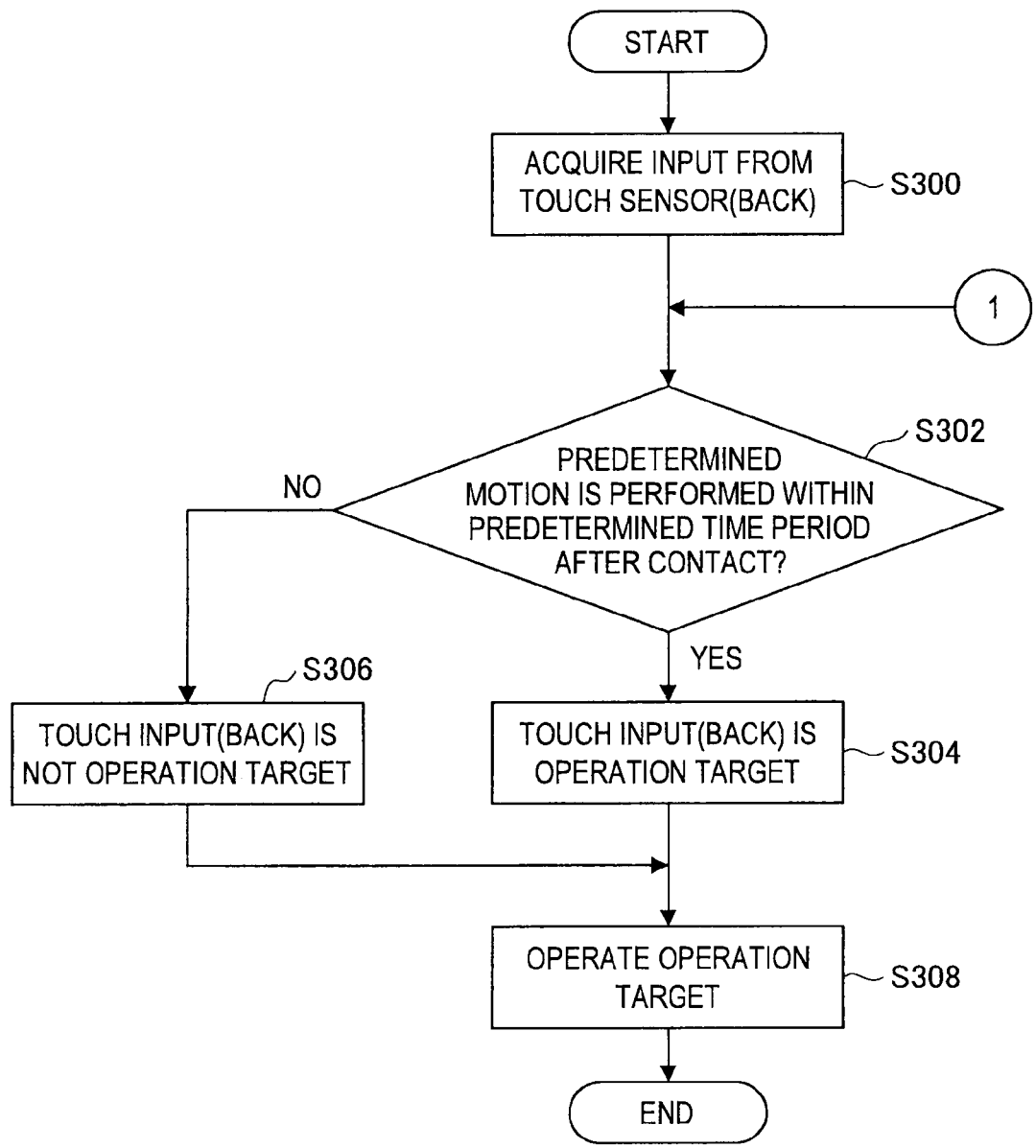
FIG. 8 is a flowchart showing processing of determining execution of operation processing when an explicit motion is added.

Next, with reference to FIG. 8, there will be described processing of determining execution of operation processing when an explicit motion is added. Note that FIG. 8 is a flowchart showing the processing of determining execution of operation processing when an explicit motion is added. Note that, in FIG. 8, the information processing terminal 100 may include the touch sensor 130 at least at the back surface side.

As shown in FIG. 8, first, the operation control section 142 acquires an input to the touch sensor 130 at the back surface side (S300). Subsequently, when there is contact of the operating object with the touch sensor 130, the operation control section 142 determines whether or not a predetermined motion is performed within a predetermined time period after the contact (S302). In this example, when the user intentionally performs a predetermined motion to the information processing terminal 100 in the case of operating the information processing terminal 100, the operation input to the touch sensor 130 is enabled. Here, the predetermined motion represents a motion for sending an intentional sign for enabling the operation input to the touch sensor 130 by the user, and examples of the motions include a tap or double tap operation, an operation of drawing a specific graphic such as a circular arc, a rectangle, or a wavy shape, and a long pressing operation. In the case where such a motion is detected, it is determined that the user is intentionally performing the operation input to the touch sensor 130, and the operation control section 142 enables the operation input from the touch sensor 130.

Note that, in Step S302, although it is determined whether or not a predetermined motion is performed within a predetermined time period at the beginning of operation, the present disclosure is not limited to such an example. For example, it may be determined whether or not a predetermined motion is performed immediately before the operating object is released from the touch sensor 130. When the determination condition of Step S302 is satisfied, the operation control section 142 enables the operation input to the touch sensor 130 (S304). On the other hand, when the determination condition of Step S302 is not satisfied, the operation control section 142 disables the operation input to the touch sensor 130 (S306). After that, the operation control section 142 executes the operation processing corresponding to the touch point which is set as an operation target based on the determination results of Steps S304 and S306 (S210).

In this example, although it is only determined whether or not a predetermined motion is performed within a predetermined time period after the contact of the operating object with the touch sensor 130, there may be further added another determination condition. For example, there may be performed determination processes on the size of the contact area with the touch sensor 130 or the movement amount of the touch point, which are performed in Steps S110 to S114 of FIG. 4.

Further, in this example, when the determination condition of Step S302 is satisfied, although it is set that all the operation inputs to the touch sensor 130 are enabled, only a predetermined operation input may be enabled. For example, among the operation inputs to the touch sensor 130, it may be set such that only a sliding operation in a predetermined direction is enabled and other operations are disabled. In addition thereto, the operations that are enabled may be limited only to a tap or double tap operation, a long pressing operation, and the like.

Heretofore, there have been described the configuration of the information processing terminal 100 according to the present embodiment and the processing of determining execution of operation processing performed by the information processing terminal 100. According to the information processing terminal 100, when there is a predetermined operation input to the touch sensor 130, the operation input on the touch sensor 130 (130a) at the back surface side is disabled. Accordingly, also in the case where the user unintentionally touches the touch sensor 130 (130a) at the back surface side, it is determined by the operation control section 142 that the operation is the unintended operation, and hence, a malfunction caused by such an operation input can be prevented. Therefore, it is possible to enhance operability of the information processing terminal 100 which includes the touch sensor 130 at the back surface side.

Further, the processing of preventing the erroneous operation described above is effective in the case of providing the information processing terminal 100 according to the present embodiment with a multi-touch-detectable touch sensor. In addition, a pseudo pressure of a contact site applied by the user to the touch sensor 130 and a shape of the contact site may be expressed by displaying, using a pseudo image, image information of a capacitance for each grid in the touch sensor 130 such as an area, a change rate of the area, and a peak value of capacitance. In this way, the user performs operation while referring to the pseudo image, then the operation state until the operation processing is executed can be visually recognized, and the operability of the information processing terminal 100 can be enhanced.

<3. Example of Hardware Configuration>

Figure 9:
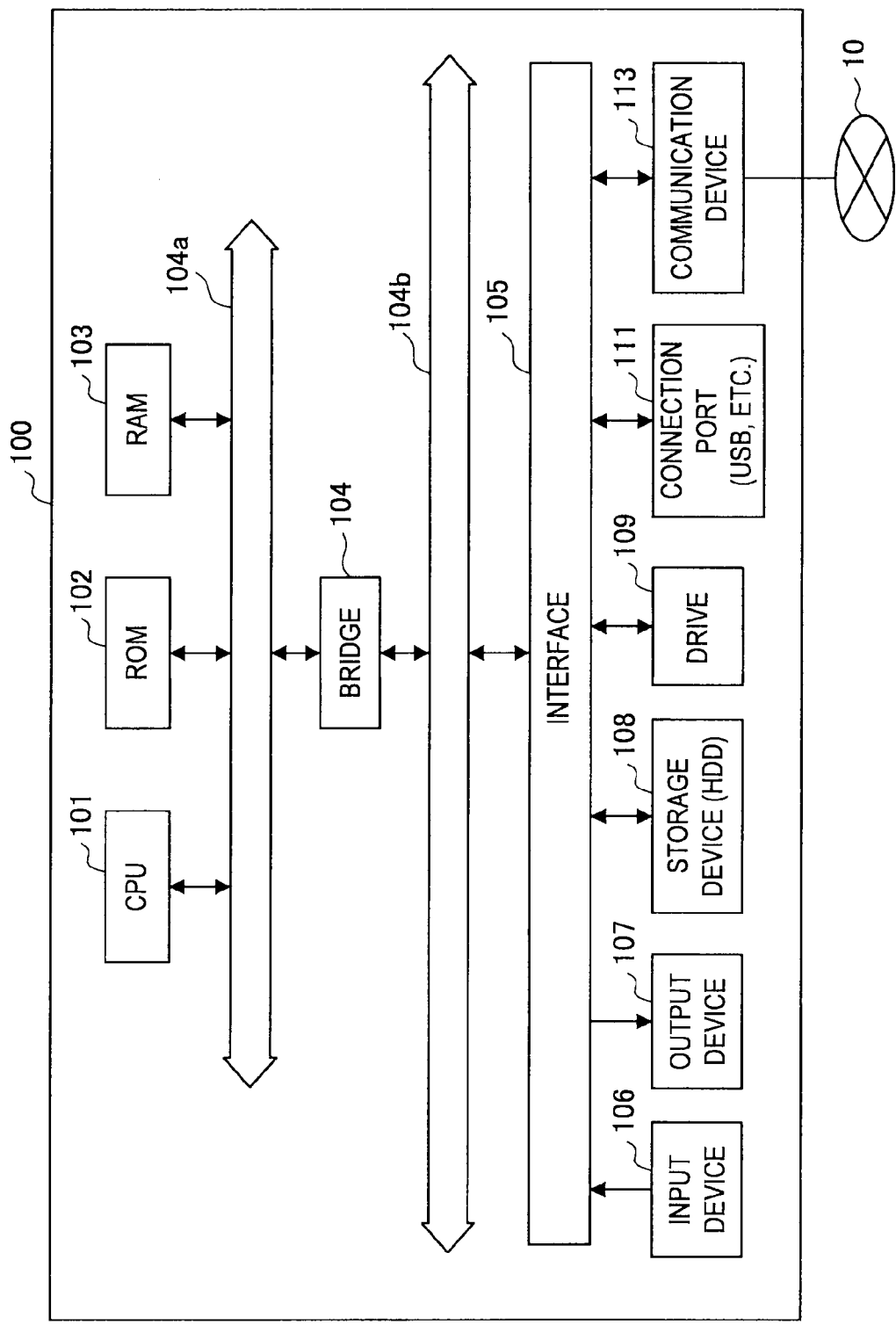
FIG. 9 is a block diagram showing an example of a hardware configuration of the information processing terminal according to the embodiment.

The processing performed by the information processing terminal 100 according to the present embodiment may be executed by hardware or may be executed by software. In this case, the information processing terminal 100 may be configured as shown in FIG. 9. Hereinafter, with reference to FIG. 9, an example of a hardware configuration of the information processing terminal 100 according to the present embodiment will be described.

The information processing terminal 100 according to the present embodiment can be realized by, as described above, a processing device such as a computer. As shown in FIG. 9, the information processing terminal 100 includes a CPU (Central Processing Unit) 101, a ROM (Read Only Memory) 102, a RAM (Random Access Memory) 103, and a host bus 104a. Further, the information processing terminal 100 includes a bridge 104, an external bus 104b, an interface 105, an input device 106, an output device 107, a storage device (HDD) 108, a drive 109, a connection port 111, and a communication device 113.

The CPU 101 functions as an arithmetic processing unit and a control unit, and controls entire operation of the information processing terminal 100 in accordance with various programs. Further, the CPU 101 may be a microprocessor. The ROM 102 stores a program, a calculation parameter, and the like used by the CPU 101. The RAM 103 temporarily stores a program used in execution of the CPU 101, a parameter varying as appropriate during the execution, and the like. They are connected with each other via the host bus 104a configured from a CPU bus or the like.

The host bus 104a is connected to the external bus 104b such as a PCI (Peripheral Component Interconnect/Interface) bus via the bridge 104. Note that it is not necessary that the host bus 104a, the bridge 104, and the external bus 104b be configured separately, and the functions thereof may be implemented in one bus.

The input device 106 is configured from, for example, input means for inputting information by a user, such as a mouse, a keyboard, a touch panel, a button, a microphone, a switch, and a lever, and an input control circuit which generates an input signal based on the input by the user and outputs the generated input signal to the CPU 101. The output device 107 includes, for example, display devices such as a liquid crystal display (LCD) device, an OLED (Organic Light Emitting Diode) device, and a lamp, and an audio output device such as a speaker.

The storage device 108 is an example of a storage section of the information processing terminal 100, and is a device for storing data. The storage device 108 may include, for example, a storage medium, a recording device for recording data in the storage medium, a reading device for reading out the data from the storage medium, and a deletion device for deleting the data recorded in the storage medium. The storage device 108 is configured from an HDD (Hard Disk Drive), for example. The storage device 108 drives a hard disk and stores a program and various data executed by the CPU 101.

The drive 109 is a reader/writer for the storage medium and is built in or externally attached to the information processing terminal 100. The drive 109 reads out information recorded in a removable recording medium which is mounted thereto, such as a magnetic disk, an optical disk, a magneto-optical disk, or a semiconductor memory, and outputs the information to the RAM 103.

The connection port 111 is an interface connected to an external device, and is a connection port with an external device capable of transmitting data by a USB (Universal Serial Bus), for example. Further, the communication device 113 is a communication interface which is configured from, for example, a communication device for establishing a connection with a communication network 10. In addition, the communication device 113 may be a wireless LAN (Local Area Network) enabled communication device, a wireless USB enabled communication device, or a wired communication device for performing wired communication.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-175637 filed in the Japan Patent Office on Aug. 4, 2010, the entire content of which is hereby incorporated by reference.

What is claimed is:

1. An information processing apparatus comprising:
a display section;
a first contact detection section which is provided on a surface at an opposite side of the display section;
a second contact detection section at a side of the display section; and an operation control section which decides, when a predetermined operation input is performed based on a detection result obtained by the contact detection section, not to execute predetermined operation processing corresponding to at least a part of the operation input to the contact detection section, wherein, when a distance between coordinates of a contact point detected by the first contact detection section and coordinates of a contact point detected by the second contact detection section is equal to or less than a predetermined value, the operation control section decides not to execute operation processing corresponding to the operation input.

2. The information processing apparatus according to claim 1, wherein, when a plurality of contact points are detected by the first contact detection section, the operation control section decides not to execute operation processing corresponding to an operation input based on a contact point other than an initially detected contact point.

3. The information processing apparatus according to claim 1, wherein, when the information processing apparatus is in a predetermined functional state, the operation control section decides, even in a case of determining that the operation input is performed based on the detection result obtained by the first contact detection section, not to execute operation processing corresponding to the operation input.

4. The information processing apparatus according to claim 3, further comprising wherein, when a contact point is detected by the second contact detection section, even if the information processing apparatus is in the predetermined functional state, the operation control section decides to execute operation processing corresponding to the detection result obtained by the first contact detection section.

5. The information processing apparatus according to claim 1, wherein, when an amount of displacement of a contact point within a predetermined time period is equal to or less than a predetermined amount based on the detection result obtained by the first contact detection section, the operation control section decides not to execute the predetermined operation processing corresponding to at least a part of the operation input to the first contact detection section.

6. The information processing apparatus according to claim 1, further comprising wherein, when an operation input is detected only from the first contact detection section based on the detection result obtained by the first contact detection section and a detection result obtained by the second contact detection section, the operation control section decides not to execute operation processing corresponding to the operation input.

7. The information processing apparatus according to claim 1, wherein, when the distance between the coordinates of the contact point detected by the first contact detection section and the coordinates of the contact point detected by the second contact detection section is equal to or less than the predetermined value, and when a distance between coordinates of a predetermined object displayed on the display section and the coordinates of the contact point detected by the first contact detection section is equal to or less than a second predetermined value, the operation control section decides not to execute operation processing corresponding to the operation input.

8. The information processing apparatus according to claim 1, wherein, when a contact area on the first contact detection section is equal to or more than a predetermined value based on the detection result obtained by the first contact detection section, the operation control section decides not to execute the predetermined operation processing corresponding to at least a part of the operation input to the first contact detection section.

9. The information processing apparatus according to claim 1, wherein, when it is detected that a predetermined operation input is further performed within a predetermined time period after a contact point is detected by the first contact detection section, the operation control section decides to execute operation processing based on the contact point.

10. The information processing apparatus according to claim 1, wherein, when a time period taken for performing the operation input to the first contact detection section is equal to or less than a predetermined time period based on the detection result obtained by the first contact detection section, the operation control section decides not to execute the predetermined operation processing corresponding to at least a part of the operation input to the contact detection section.

11. An information processing method comprising:

detecting, by a contact detection section which is provided on a surface at an opposite side of a display section, contact with an operating object;

detecting, by a second contact detection section at a side of the display section, a contact point;

deciding, when a predetermined operation input is performed based on a detection result obtained by the contact detection section, not to execute predetermined operation processing corresponding to at least a part of the operation input to the contact detection section; and deciding, when a distance between coordinates of a contact point detected by the first contact detection section and coordinates of the contact point detected by the second contact detection section is equal to or less than a predetermined value, not to execute operation processing corresponding to the operation input.

12. A non-transitory computer readable storage medium having instructions stored therein, which when executed by a processor in an information processing apparatus causes the processor to execute a method comprising:

detecting, by a contact detection section which is provided on a surface at an opposite side of a display section, contact with an operating object;

detecting, by a second contact detection section at a side of the display section, a contact point;

deciding, when a predetermined operation input is performed based on a detection result obtained by the contact detection section, not to execute predetermined operation processing corresponding to at least a part of the operation input to the contact detection section; and deciding, when a distance between coordinates of a contact point detected by the first contact detection section and coordinates of the contact point detected by the second contact detection section is equal to or less than a predetermined value, not to execute operation processing corresponding to the operation.

* * * * *